United States Patent
Murphy (10) Patent No.: US 11,867,135 B1
(45) Date of Patent: Jan. 9, 2024

(54) VECTORING EXHAUST NOZZLE FOR AN AIRCRAFT POWERPLANT

(71) Applicant: Raytheon Technologies Corporation, Farmington, CT (US)

(72) Inventor: Michael Murphy, Windsor, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 17/944,798

(22) Filed: Sep. 14, 2022

(51) Int. Cl.
*F02K 1/00* (2006.01)
*F02K 1/12* (2006.01)
*F02K 1/40* (2006.01)
*F02K 1/62* (2006.01)

(52) U.S. Cl.
CPC ............ *F02K 1/1207* (2013.01); *F02K 1/004* (2013.01); *F02K 1/40* (2013.01); *F02K 1/625* (2013.01); *F05D 2220/32* (2013.01)

(58) Field of Classification Search
CPC ........ F02K 1/1207; F02K 1/1223; F02K 1/62; F02K 1/625; F02K 1/40; F02K 1/004
See application file for complete search history.

(56) References Cited

U.S. PATENT DOCUMENTS

| | | | |
|---|---|---|---|
| 2,546,293 A * | 3/1951 | Berliner | F02K 1/40 239/265.43 |
| 2,972,860 A | 2/1961 | Moy | |
| 2,986,877 A * | 6/1961 | Emmons | F02K 1/004 285/364 |
| 3,206,929 A * | 9/1965 | Marchant | B64C 29/0066 60/229 |
| 3,273,339 A * | 9/1966 | Borysthen-Tkacz | B64C 29/0025 239/265.29 |
| 3,409,228 A | 11/1968 | Mehr | |
| 3,747,855 A | 7/1973 | Vdoviak | |
| 3,973,731 A | 8/1976 | Thayer | |
| 3,989,192 A * | 11/1976 | Enderle | F02K 1/1207 239/265.35 |
| 4,805,840 A | 2/1989 | Tape | |
| 4,898,343 A | 2/1990 | Kamo | |
| 4,948,072 A | 8/1990 | Garland | |
| 5,098,022 A | 3/1992 | Thayer | |
| 5,209,428 A | 5/1993 | Bevilaqua | |
| 5,297,388 A | 3/1994 | Nightingale | |
| 5,407,150 A | 4/1995 | Sadleir | |
| 5,470,020 A | 11/1995 | Brossier | |
| 5,794,434 A * | 8/1998 | Szupkay | F02K 1/625 239/265.29 |
| 5,826,794 A | 10/1998 | Rudolph | |
| 5,884,843 A | 3/1999 | Lidstone | |
| 7,093,793 B2 | 8/2006 | Lair | |

(Continued)

*Primary Examiner* — Katheryn A Malatek
(74) *Attorney, Agent, or Firm* — Getz Balich LLC (57) ABSTRACT

An assembly is provided for an aircraft. This aircraft assembly includes a powerplant. The powerplant includes a gas turbine engine, an exhaust nozzle and a flowpath extending from the gas turbine engine to the exhaust nozzle. The exhaust nozzle is movable between a first position and a second position. The exhaust nozzle is configured to exhaust combustion products, received through the flowpath from the gas turbine engine, when the exhaust nozzle is in the first position. The exhaust nozzle is configured to block flow of the combustion products through the flowpath when the exhaust nozzle is in the second position.

17 Claims, 8 Drawing Sheets

(56) References Cited

U.S. PATENT DOCUMENTS

| | | | |
|---|---|---|---|
| 10,077,108 B2* | 9/2018 | Lauder | B64C 23/069 |
| 2016/0010590 A1* | 1/2016 | Rolt | F02K 1/15 |
| | | | 60/805 |
| 2018/0094605 A1 | 4/2018 | Rosenau | |

* cited by examiner

VECTORING EXHAUST NOZZLE FOR AN AIRCRAFT POWERPLANT

BACKGROUND OF THE DISCLOSURE

1. Technical Field

This disclosure relates generally to an aircraft and, more particularly, to an exhaust nozzle for a powerplant of the aircraft.

2. Background Information

An aircraft powerplant with a gas turbine engine typically includes an exhaust nozzle for exhaust combustion products generated by the gas turbine engine. Various types and configurations of exhaust nozzles are known in the art. While these known exhaust nozzles have various benefits, there is still room in the art for improvement. There is a need in the art therefore for an aircraft powerplant with an improved exhaust nozzle.

SUMMARY OF THE DISCLOSURE

According to an aspect of the present disclosure, an assembly is provided for an aircraft. This aircraft assembly includes a powerplant. The powerplant includes a gas turbine engine, an exhaust nozzle and a flowpath extending from the gas turbine engine to the exhaust nozzle. The exhaust nozzle is movable between a first position and a second position. The exhaust nozzle is configured to exhaust combustion products, received through the flowpath from the gas turbine engine, when the exhaust nozzle is in the first position. The exhaust nozzle is configured to block flow of the combustion products through the flowpath when the exhaust nozzle is in the second position.

According to another aspect of the present disclosure, another assembly is provided for an aircraft. This aircraft assembly includes a powerplant. The powerplant includes a gas turbine engine, an exhaust nozzle and a flowpath extending from the gas turbine engine to the exhaust nozzle. The exhaust nozzle includes an outlet orifice. The exhaust nozzle is movable between a first position and a second position. The exhaust nozzle is configured to fluidly couple the outlet orifice to the flowpath when the exhaust nozzle is in the first position. The exhaust nozzle is configured to fluidly decouple the outlet orifice from the flowpath when the exhaust nozzle is in the second position.

According to still another aspect of the present disclosure, another assembly is provided for an aircraft. This aircraft assembly includes a powerplant. The powerplant includes a gas turbine engine, an exhaust duct, an exhaust nozzle, a vent and a flowpath extending from the gas turbine engine, through the exhaust duct, to the exhaust nozzle. The exhaust nozzle is movable between a first position and a second position. The vent is configured to close an opening in a sidewall of the exhaust duct when the exhaust nozzle is in the first position. The vent is configured to open the opening in the sidewall of the exhaust duct when the exhaust nozzle is in the second position.

The exhaust nozzle may be configured to exhaust combustion products, received through the exhaust duct from the gas turbine engine, when the exhaust nozzle is in the first position. The exhaust nozzle may be configured to block flow of the combustion products through an end of the exhaust duct when the exhaust nozzle is in the second position.

The exhaust nozzle may be configured to rotate between the first position and the second position.

The exhaust nozzle may include an outlet orifice and a passage that extends through the exhaust nozzle to the outlet orifice. The passage may be fluidly coupled with the flowpath when the exhaust nozzle is in the first position. The passage may be fluidly decoupled from the flowpath when the exhaust nozzle is in the second position.

A passage may extend through the exhaust nozzle along a nozzle centerline. The nozzle centerline of the exhaust nozzle in the first position may be angularly offset from the nozzle centerline of the exhaust nozzle in the second position by an included angle.

The powerplant may also include an exhaust duct between the gas turbine engine and the exhaust nozzle. The exhaust nozzle may be configured to open a downstream end of the exhaust duct when the exhaust nozzle is in the first position. The exhaust nozzle may be configured to close the downstream end of the exhaust duct when the exhaust nozzle is in the second position.

The exhaust nozzle may include a nozzle sidewall. The nozzle sidewall may extend along the flowpath when the exhaust nozzle is in the first position. The nozzle sidewall may extend across the flowpath when the exhaust nozzle is in the second position.

The exhaust nozzle may include an outlet orifice and a passage that extends through the exhaust nozzle to the outlet orifice. The exhaust nozzle may converge as the passage extends to the outlet orifice.

A first cross-sectional geometry of the flowpath at the gas turbine engine may be circular. A second cross-sectional geometry of the flowpath at the exhaust nozzle may be non-circular.

The flowpath may have a lateral width and a vertical height. The flowpath may have a first aspect ratio between the lateral width and the vertical height at the gas turbine engine. The flowpath may have a second aspect ratio between the lateral width and the vertical height at the exhaust nozzle that is greater than the first aspect ratio.

The powerplant may also include an exhaust duct and a door. The exhaust duct may form a portion of the flowpath between the gas turbine engine and the exhaust nozzle. The door may be configured to close an opening in a sidewall of the exhaust duct when the exhaust nozzle is in the first position. The door may be configured to open the opening in the sidewall of the exhaust duct when the exhaust nozzle is in the second position.

The door may be configured to pivot between a closed position and an open position.

The powerplant may also include a second door upstream of the door along the flowpath. The second door may be configured to close a second opening in the sidewall of the exhaust duct when the exhaust nozzle is in the first position. The second door may be configured to open the second opening in the sidewall of the exhaust duct when the exhaust nozzle is in the second position.

The exhaust nozzle may be configured to exhaust the combustion products in a first direction when the exhaust nozzle is in the first position. The powerplant may also include a vent between the gas turbine engine and the exhaust nozzle along the flowpath. The vent may be configured to open and vent the combustion products in a second direction when the exhaust nozzle is in the second position.

The assembly may also include an airframe. The gas turbine engine may be arranged within the airframe.

The assembly may also include a propulsor rotor. The gas turbine engine may be configured to power rotation of the propulsor rotor.

The assembly may also include a second propulsor rotor. The gas turbine engine may be configured to power rotation of the second propulsor rotor. The gas turbine engine may be positioned laterally between the propulsor rotor and the second propulsor rotor.

The assembly may also include a tiltrotor module configure to adjust an orientation of a rotational axis of the propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
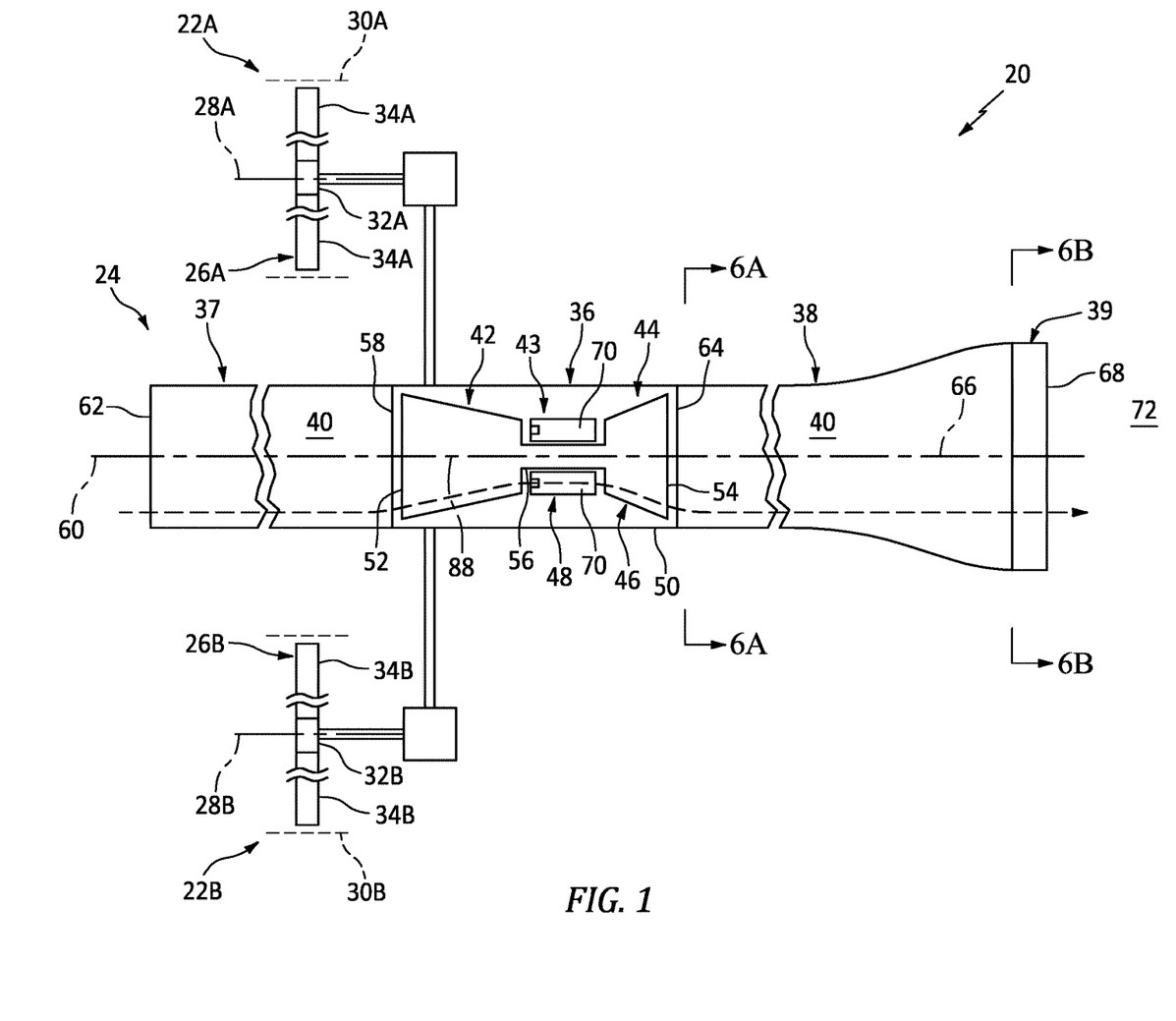
FIG. 1 is a schematic illustration of a propulsion system for an aircraft.

FIG. 1 is a schematic illustration of a propulsion system 20 for an aircraft. This aircraft propulsion system 20 includes one or more aircraft propulsors 22A and 22B (generally referred to as "22") and an aircraft powerplant 24.

Each of the aircraft propulsors 22 may be configured as a discrete propulsion unit; e.g., a module, pod, etc. The aircraft propulsors 22 of FIG. 1, for example, are laterally offset from one another, where the aircraft powerplant 24 is positioned laterally between the aircraft propulsors 22A and 22B. The present disclosure, however, is not limited to such an exemplary arrangement. The aircraft powerplant 24, for example, may alternatively be positioned laterally to a side of both aircraft propulsors 22, or the aircraft propulsors 22A and/or 22B may be otherwise positioned.

Each of the aircraft propulsor 22 includes at least (or only) one bladed propulsor rotor 26A, 26B (generally referred to as "26"). This propulsor rotor 26A, 26B is rotatable about a rotational axis 28A, 28B (generally referred to as "28") of the respective aircraft propulsor 22. The propulsor rotor 26 may be configured as an open rotor such as a propeller rotor or a helicopter rotor. However, in other embodiments, the propulsor rotor 26 may alternatively be configured as a ducted rotor; e.g., a fan rotor housed within a respective propulsor duct (e.g., see dashed lines 30A, 30B). The propulsor rotor 26 includes a rotor disk 32A, 32B (generally referred to as "32") and a plurality of rotor blades 34A, 34B (generally referred to as "34") (e.g., propeller blades, fan blades, etc.) arranged circumferentially about and connected to the rotor disk 32. The rotor blades 34, for example, may be formed integral with or mechanically fastened, welded, brazed, adhered and/or otherwise attached to the rotor disk 32. The rotor blades 34 may be stationary rotor blades. Alternatively, one or more or all of the rotor blades 34 may be variable pitch rotor blades.

The aircraft powerplant 24 is configured to power the one or more aircraft propulsors 22. The aircraft powerplant 24 of FIG. 1 includes a gas turbine engine 36, an inlet duct 37, an exhaust duct 38, an exhaust nozzle 39 and a flowpath 40; e.g., an engine flowpath, a core flowpath.

The gas turbine engine 36 of FIG. 1 includes a compressor section 42, a combustor section 43 and a turbine section 44 arranged sequentially along the flowpath 40 between the inlet duct 37 and the exhaust duct 38. This gas turbine engine 36 also includes an engine rotating structure 46 (e.g., a spool), a combustor 48 and an engine case 50 housing the engine rotating structure 46 and the combustor 48. The engine rotating structure 46 includes a bladed compressor rotor 52, a bladed turbine rotor 54 and an engine shaft 56 connecting and rotatable with the compressor rotor 52 and the turbine rotor 54. The compressor rotor 52 is arranged in the compressor section 42. The turbine rotor 54 is arranged within the turbine section 44. The combustor 48 is arranged within the combustor section 43.

The engine rotating structure 46 of FIG. 1 is operatively coupled to each of the aircraft propulsors 22 such that rotation of the engine rotating structure 46 may directly or indirectly drive rotation of the propulsor rotors 26. The engine rotating structure 46, for example, may be mechanically coupled to the propulsor rotors 26 through a drivetrain (or multiple drivetrains, one for each aircraft propulsor 22). The engine rotating structure 46 may alternatively be electromechanically coupled to the propulsor rotors 26 through an electromechanical system. This electromechanical system may include an electrical generator and an electric motor for each propulsor rotor 26. The engine rotating structure 46 may be coupled to and drive operation of the electrical generator. The electrical generator may provide electricity (directly or indirectly) to the electric motors, which electric motors in turn may drive rotation of the propulsor rotors 26. Of course, various other mechanical and/or electromechanical systems/arrangements may be provided for operatively coupling the gas turbine engine 36 and its engine rotating structure 46 to the aircraft propulsors 22 and their propulsor rotors 26.

The gas turbine engine 36 is described above as a single spool gas turbine engine for ease of description. The gas turbine engine 36 of the present disclosure, however, is not limited to such an exemplary configuration. The gas turbine engine 36, for example, may include multiple of the rotating structures 46 (e.g., spools) such that, for example, the compressor section 42 includes at least a low pressure compressor (LPC) rotor and a high pressure compressor (HPC) rotor and/or the turbine section 44 includes at least a high pressure turbine (HPT) rotor and a low pressure turbine (LPT) rotor. Each rotating structure 46 may include a compressor rotor, a turbine rotor and an engine shaft as described above. Alternatively, one of the rotating structures 46 (e.g., the rotating structure operatively coupled to the propulsor rotor(s) 26) may be configured without a compressor rotor where, for example, its turbine rotor is configured as a free turbine rotor/a power turbine rotor. The gas turbine engine 36 may also or alternatively be configured as a direct drive gas turbine engine or a geared gas turbine engine; e.g., where a geartrain couples together one or more rotors and/or rotating structures.

The inlet duct 37 is fluidly coupled with an inlet 58 to the gas turbine engine 36; e.g., an inlet to the compressor section 42. The inlet duct 37 is upstream of the gas turbine engine 36 and its inlet 58 along the flowpath 40. The inlet duct 37 of FIG. 1, for example, extends longitudinally along a longitudinal centerline 60 of the inlet duct 37 from an inlet 62 into the aircraft powerplant 24 (e.g., an inlet duct inlet) to the gas turbine engine inlet 58.

The exhaust duct 38 is fluidly coupled with an outlet 64 from the gas turbine engine 36; e.g., an outlet from the turbine section 44. The exhaust duct 38 is downstream of the gas turbine engine 36 and its outlet 64 along the flowpath 40. The exhaust duct 38 is also upstream of the exhaust nozzle 39. The exhaust duct 38 of FIG. 1, for example, extends longitudinally along a longitudinal centerline 66 of the exhaust duct 38 from the gas turbine engine outlet 64 to the exhaust nozzle 39.

The exhaust nozzle 39 is downstream of the exhaust duct 38. The exhaust nozzle 39 of FIG. 1, for example, is configured to form an aft, downstream end of the flowpath 40. With this arrangement, the flowpath 40 of FIG. 1 extends sequentially through the inlet duct 37, the compressor section 42, the combustor section 43, the turbine section 44, the exhaust duct 38 and the exhaust nozzle 39 to an outlet orifice 68 of the exhaust nozzle 39.

During operation of the aircraft propulsion system 20, air enters the flowpath 40 through the inlet 62. The inlet duct 37 directs the air into the gas turbine engine 36 and its compressor section 42. The air is compressed by the compressor rotor 52 and directed into a combustion chamber 70 of the combustor 48. The fuel is injected into the combustion chamber 70 by one or more fuel injectors and mixed with the compressed air to provide a fuel-air mixture. This fuel-air mixture is ignited and combustion products thereof flow through the turbine section 44, through the exhaust duct 38 and may subsequently flow out of the aircraft powerplant 24 through the exhaust nozzle 39. The exhaust nozzle 39, more particularly, may exhaust the combustion products generated by the gas turbine engine 36 into an environment 72 surrounding the aircraft—an exterior environment/an ambient environment. However, before being exhausted from the aircraft powerplant 24, the combustion products flowing through the turbine section 44 drive rotation of the turbine rotor 54 and, thus, rotation of the engine rotating structure 46. The rotation of the turbine rotor 54 drives rotation of the compressor rotor 52 and, thus, compression of the air received from the gas turbine engine inlet 58. The rotation of the engine rotating structure 46 also provides power for directly or indirectly (e.g., mechanically or electromechanically) driving rotation of the propulsor rotors 26. Rotation of these propulsor rotors 26 may generate thrust for propelling and/or maneuvering the aircraft.

Figure 2A:
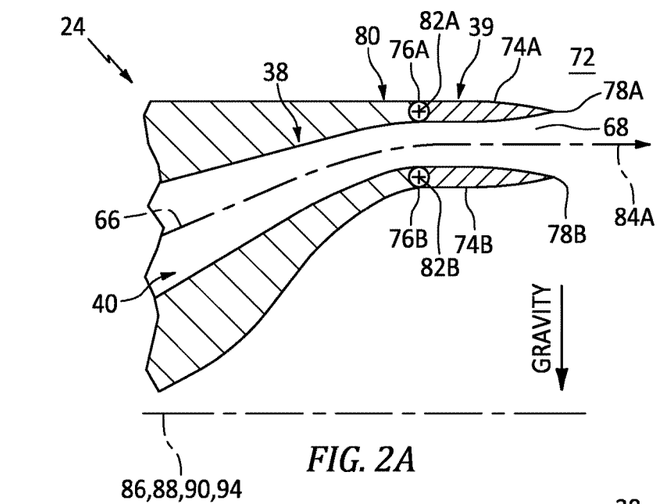
FIGS. 2A-C are sectional illustrations of a downstream portion of an exhaust duct and an exhaust nozzle in various arrangements.
Figure 2B:
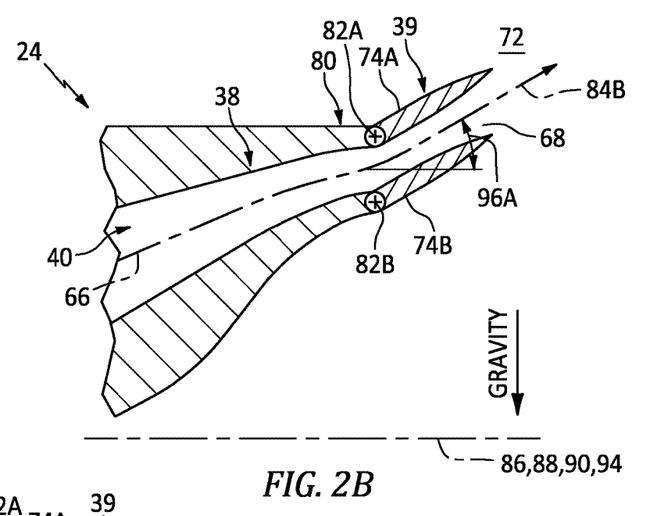

Referring to FIGS. 2A and 2B, the exhaust nozzle 39 may be configured as a thrust vectoring exhaust nozzle. The exhaust nozzle 39 of FIGS. 2A and 2B, for example, includes one or more nozzle flaps 74A and 74B (generally referred to as "74"). These nozzles flaps 74 are disposed on opposing sides of the flowpath 40. The top nozzle flap 74A, for example, is disposed at a vertical top side of the flowpath 40 and the bottom nozzle flap 74B is disposed at a vertical bottom side of the flowpath 40. The terms "top" and "bottom" (as well as "upper" and "lower" and the like) may be used herein to describe a relative orientation of component(s) relative to gravity. The top nozzle flap 74A of FIGS. 2A and 2B, for example, is vertically above the bottom nozzle flap 74B with respect to gravity. The top nozzle flap 74A may thereby at least partially or completely form a top peripheral boundary of the flowpath 40 within the exhaust nozzle 39 to the outlet orifice 68. The bottom nozzle flap 74B may similarly at least partially or completely form a bottom peripheral boundary of the flowpath 40 within the exhaust nozzle 39 to the outlet orifice 68.

Each of the nozzle flaps 74 is configured to move between a non-vectored (e.g., horizontal) position of FIG. 2A and a vectored (e.g., angled upward) position FIG. 2B. Each of the nozzle flaps 74 of FIG. 2A, for example, extends longitudinally from a forward, upstream end 76A, 76B (generally referred to as "76") of the respective nozzle flap 74 to an aft, downstream end 78A, 78B (generally referred to as "78") of the respective nozzle flap 74. Each of the nozzle flaps 74 is pivotally connected to a support structure 80 at (e.g., on, adjacent or proximate) its flap upstream end 76, which support structure 80 may be configured as part of, connected to or otherwise arranged at a downstream end of the exhaust duct 38. Each of the nozzle flaps 74 may thereby pivot about a respective pivot axis 82A, 82B (generally referred to as "82") between its non-vectored position of FIG. 2A and its vectored position FIG. 2B.

When the nozzle flaps 74 are in their non-vectored positions of FIG. 2A, the exhaust nozzle 39 has a non-vectored arrangement. With this non-vectored arrangement, the exhaust nozzle 39 is operable to exhaust the combustion products out of the aircraft powerplant 24 along a non-vectored trajectory 84A. The non-vectored trajectory 84A may be parallel with a reference axis 86. Alternatively, the non-vectored trajectory 84A may be slightly angularly offset from the reference axis 86, for example, by no more than plus/minus five degrees (5°) or ten degrees (10°). The reference axis 86 may be an axial centerline/a rotational axis 88 of the gas turbine engine 36 (see FIG. 1), a horizontal axis 90 (e.g., an aircraft roll axis) of an aircraft airframe 92 (see FIG. 6), a gravitational horizon line 94, etc. The reference axis 86 may also be parallel (e.g., coaxial) with or slightly angularly offset from an aft, downstream portion of the exhaust duct centerline 60. Thus, when the exhaust nozzle 39 is in its non-vectored arrangement and the nozzle flaps 74 are in their non-vectored positions of FIG. 2A, the exhaust nozzle 39 may exhaust the combustion products out of the aircraft powerplant 24 substantially or completely horizontally. The exhaust combustion products may thereby provide/add to the forward aircraft thrust generated by the propulsor rotors 26 of FIG. 1.

When the nozzle flaps 74 are in their vectored positions of FIG. 2B, the exhaust nozzle 39 has a vectored arrangement. With this vectored arrangement, the exhaust nozzle 39 is operable to exhaust the combustion products out of the aircraft powerplant 24 along a vectored trajectory 84B. The vectored trajectory 84B is angularly offset from the reference axis 86 in a vertical upward direction by an included angle 96A; e.g., an acute angle or a right angle. The included angle 96A may be greater than ten degrees (10°); e.g., between twenty degrees (20°) and forty degrees (40°), between forty degrees (40°) and sixty degrees (60°), between sixty degrees (60°) and ninety degrees (90°). Thus, when the exhaust nozzle 39 is in its vectored arrangement and the nozzle flaps 74 are in their vectored positions of FIG. 2B, the exhaust nozzle 39 may exhaust the combustion products out of the aircraft powerplant 24 in a general upward direction away from earth ground. This vectored arrangement may thereby direct the relatively hot combustion products away from ground personnel who may be near the aircraft while the aircraft is, for example, on the ground with its gas turbine engine 36 running.

Figure 2C:
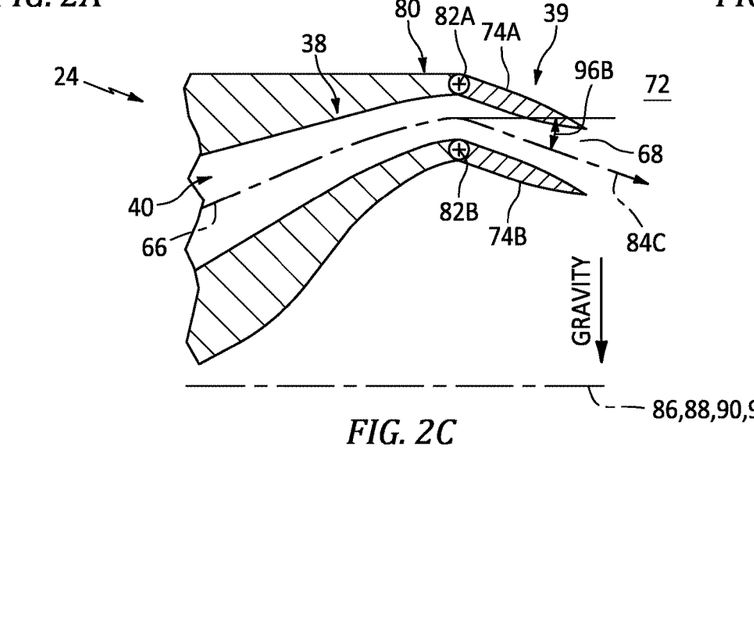

In some embodiments, referring to FIG. 2C, each of the nozzle flaps 74 may further pivot about its pivot axis 82 to a second vectored (e.g., angled downward) position. When the nozzle flaps 74 are in their second vectored positions of FIG. 2C, the exhaust nozzle 39 has a second vectored arrangement. With this second vectored arrangement, the exhaust nozzle 39 is operable to exhaust the combustion products out of the aircraft propulsion system 20 along a second vectored trajectory 84C. The second vectored trajectory 84C is angularly offset from the reference axis 86 in a vertical downward direction by an included angle 96B; e.g., an acute angle or a right angle. The included angle 96B may be greater than ten degrees (10°); e.g., between twenty degrees (20°) and forty degrees (40°), between forty degrees (40°) and sixty degrees (60°), between sixty degrees (60°) and ninety degrees (90°). The included angle 96B may be equal to or different (e.g., larger or smaller) than the included angle 96A of FIG. 2B. Thus, when the exhaust nozzle 39 is in its second vectored arrangement and the nozzle flaps 74 are in their second vectored positions of FIG. 2B, the exhaust nozzle 39 may exhaust the combustion products out of the aircraft propulsion system 20 in a general downward direction towards the ground. This second vectored arrangement may thereby provide/add to the vertical aircraft thrust; e.g., aircraft lift.

Between the non-vectored position of FIG. 2A and the vectored positions of FIG. 2B or 2C, each of the nozzle flaps 74 may pivot at least ten degrees (10°), thirty degrees (30°) or sixty degrees (60°), up to ninety degrees (90°) for example. Between the vectored positions of FIGS. 2B and 2C, each of the nozzle flaps 74 may pivot at least twenty degrees (20°), sixty degrees (60°) or one-hundred and twenty degrees (120°), up to one hundred and eighty degrees (180°) for example. Though illustrated as angled at a common included angle 96A in FIGS. 2B and 96B in FIG. 2C, it is contemplated herein that the nozzle flaps 74 may be at a common or different included angle from one another (e.g., two degree (2°) included angle difference, five degree (5°) included angle difference, etc.).

Figure 3A:
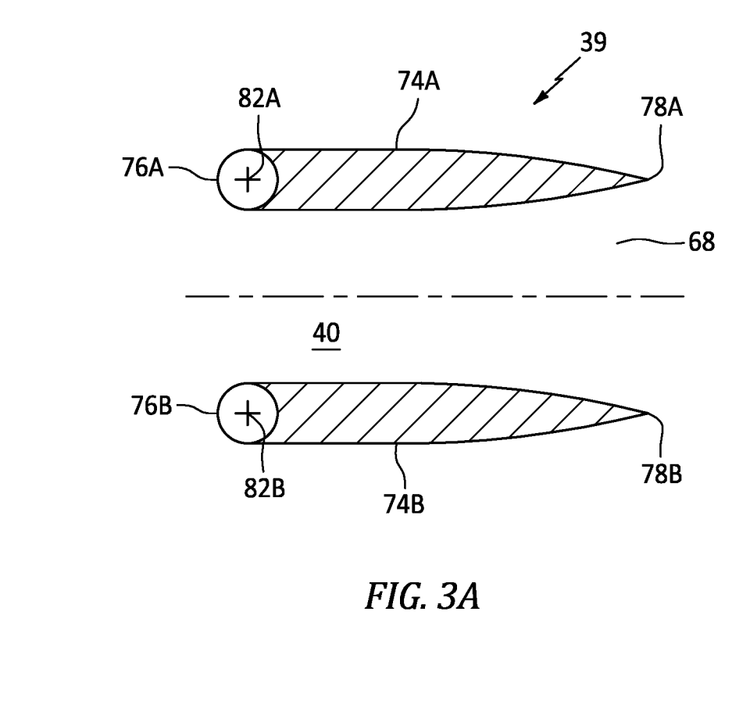
FIGS. 3A and 3B are sectional illustrations of the exhaust nozzle of FIGS. 2A-C with various nozzle flap arrangements.
Figure 3B:
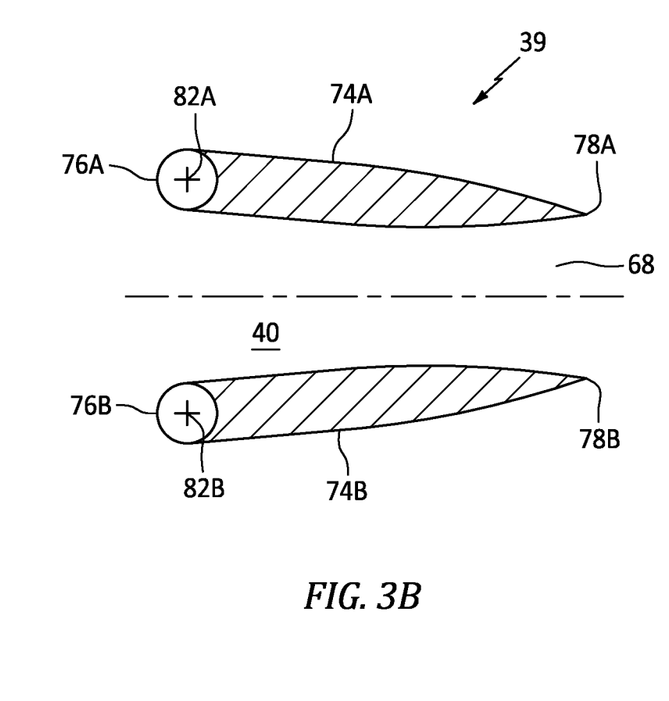

Referring to FIG. 3A, the nozzle flaps 74 may be parallel with one another while in one, some or all of the nozzle flap positions (e.g., see FIGS. 2A, 2B and/or 2C). Referring to FIG. 3B, the nozzle flaps 74 may also or alternatively converge towards one another while in one, some or all of the nozzle flap positions (e.g., see FIGS. 2A, 2B and/or 2C).

In some embodiments, the nozzle flaps 74 may be actuated (e.g., pivoted) by a common actuator/actuation system. In other embodiments, each of the nozzle flaps 74 may be discretely actuated by its own dedicated actuator/actuation system. With such an arrangement, the nozzle flaps 74 may be independently moved or may be moved synchronously together.

Figure 4:
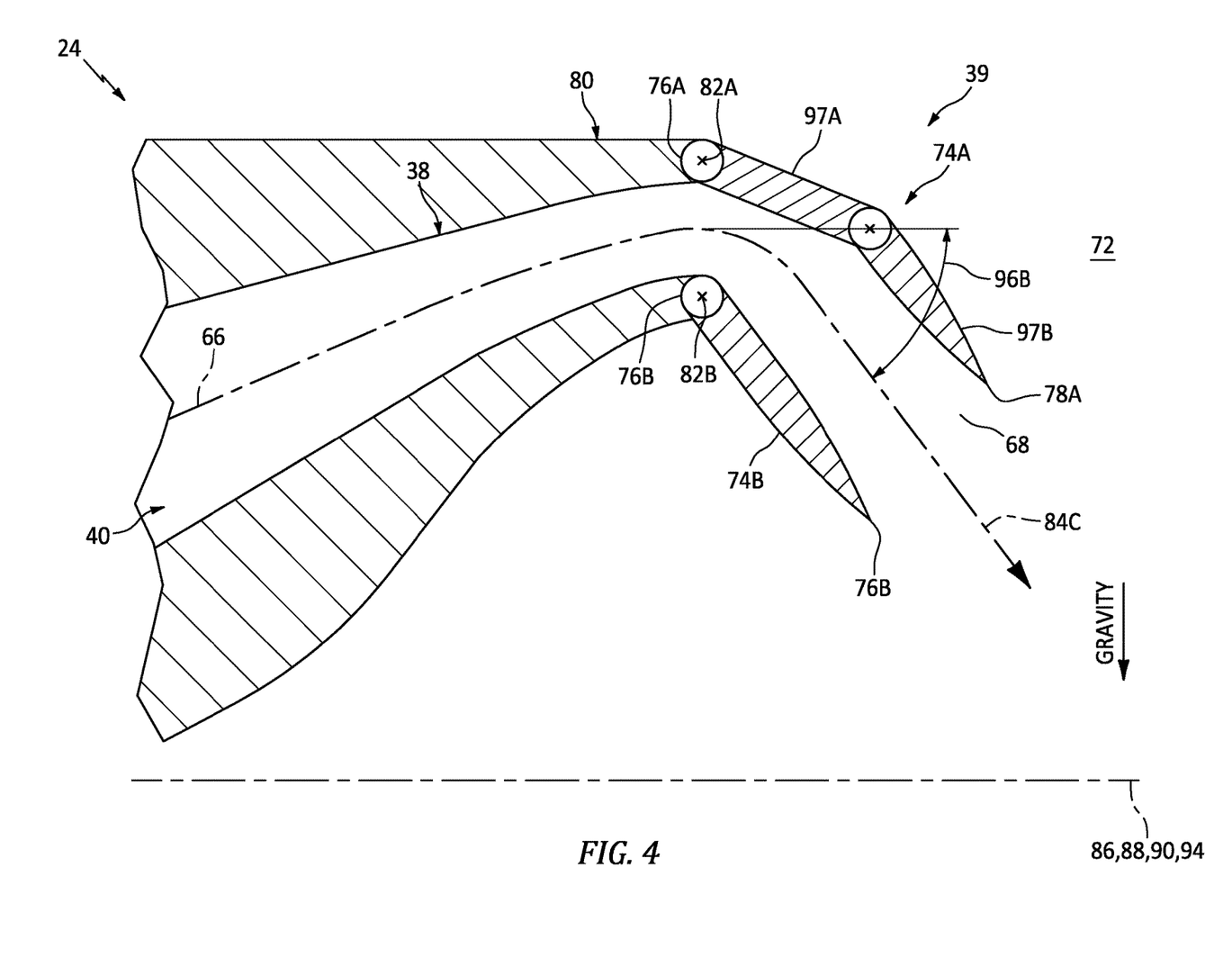
FIG. 4 is a sectional illustration of a downstream portion of an exhaust duct and an exhaust nozzle with a multi-segment nozzle flap.

In some embodiments, referring to FIG. 2C, each of the nozzle flaps 74 may be configured as a unitary (e.g., single) body nozzle flap; e.g., a non-segmented nozzle flap. In other embodiments, referring to FIG. 4, at least one of the nozzle flaps 74 (e.g., the top nozzle flap 74A) may be configured as a multi-segment nozzle flap. The top nozzle flap 74A of FIG. 4, for example, includes a first flap segment 97A (e.g., a forward and/or upstream flap segment) and a second flap segment 97B (e.g., an aft and/or downstream flap segment) that moves relative to the first nozzle flap segment 97A. The first flap segment 97A is disposed at the flap upstream end 76A. This first flap segment 97A is pivotally connected to the support structure 80. The second flap segment 97B is disposed at the flap downstream end 78A. This second flap segment 97B is pivotally connected to the first flap segment 97A. With such an arrangement, the exhaust nozzle 39 may be configured to turn the second vectored trajectory 84C further downwards and provide additional vertical thrust.

Figure 5A:
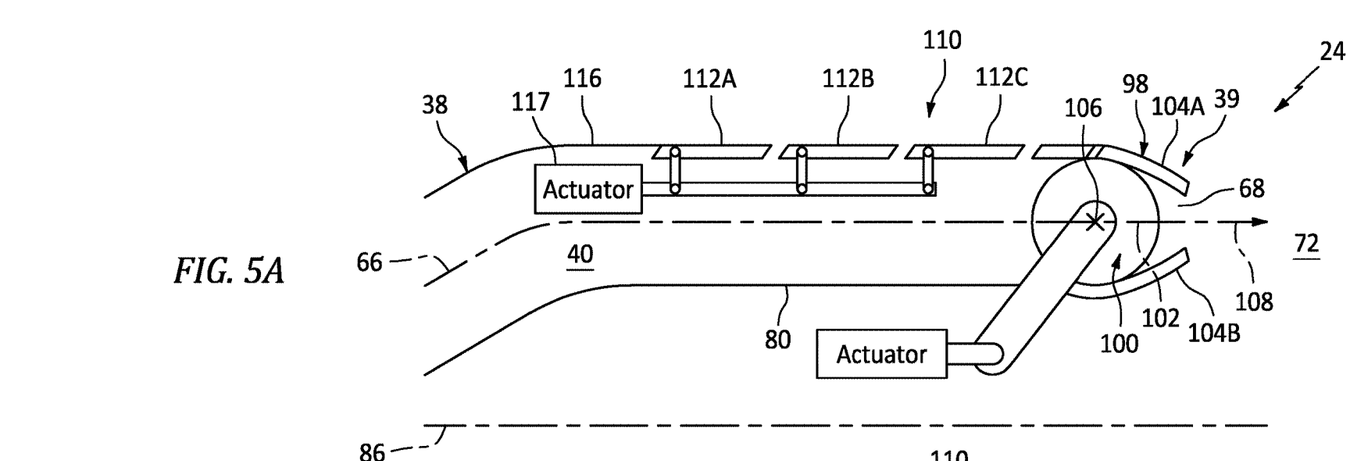
FIGS. 5A and 5B are sectional schematic illustrations of a downstream portion of another exhaust duct and another exhaust nozzle in various arrangements.
Figure 5B:
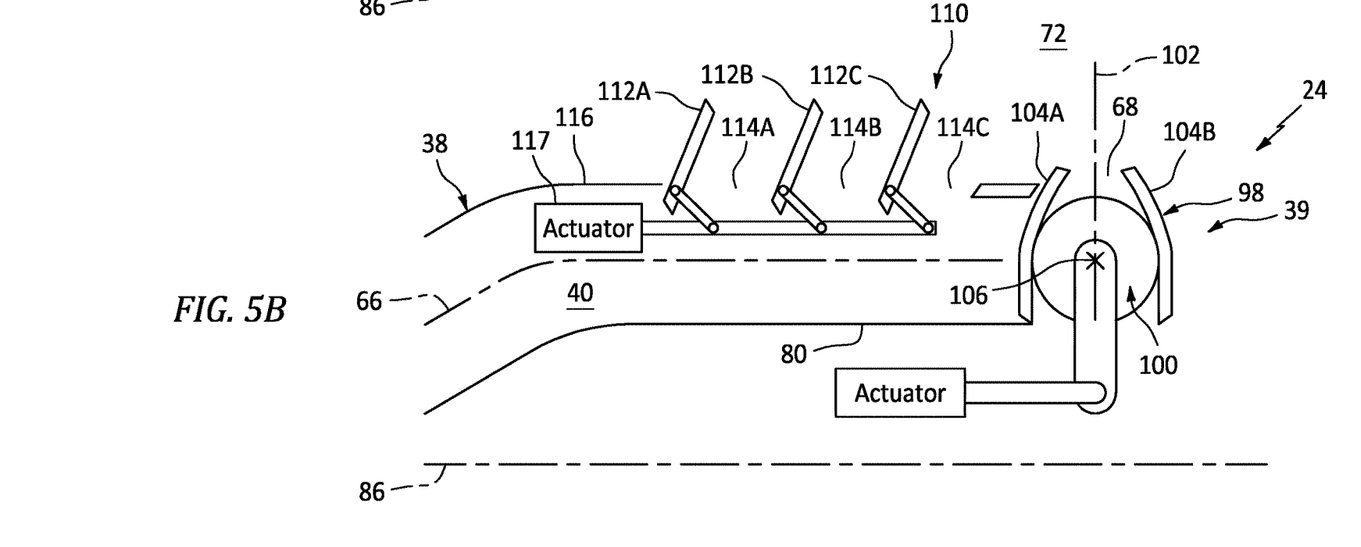

FIGS. 5A and 5B illustrate an alternative embodiment of the exhaust nozzle 39. Like the exhaust nozzle 39 of FIGS. 2A and 2B, this exhaust nozzle 39 may be configured as a thrust vectoring exhaust nozzle. The exhaust nozzle 39 of FIGS. 5A and 5B, for example, is configured as a rotary nozzle. The exhaust nozzle 39 of FIGS. 5A and 5B, in particular, has a (e.g., tubular) nozzle body 98 with a nozzle passage 100 that extends longitudinally along a centerline 102 of the exhaust nozzle 39 through the exhaust nozzle 39 and its nozzle body 98 from the exhaust duct 38 to the outlet orifice 68. A top peripheral boundary of the nozzle passage 100 is formed by a top nozzle sidewall 104A of the exhaust nozzle 39 and its nozzle body 98. A bottom peripheral boundary of the nozzle passage 100 is formed by a bottom nozzle sidewall 104B of the exhaust nozzle 39 and its nozzle body 98. The nozzle sidewalls 104A and 104B (generally referred to as "104") of FIGS. 5A and 5B converge towards one another. However, in other embodiments, the nozzle sidewalls 104 may alternatively be parallel with one another.

The exhaust nozzle 39 and its nozzle body 98 are configured to move between an open (e.g., horizontal) position of FIG. 5A and a closed (e.g., angled upward) position FIG. 5B. The exhaust nozzle 39 and its nozzle body 98 of FIGS. 5A and 5B, for example, is pivotally connected to the support structure 80. The exhaust nozzle 39 and its nozzle body 98 may thereby pivot about a pivot axis 106 between the open position of FIG. 5A and the closed position FIG. 5B.

When the exhaust nozzle 39 and its nozzle body 98 are in the open position of FIG. 5A, the nozzle sidewalls 104 may be parallel with and extend longitudinally along the flowpath 40. The nozzle passage 100 and the outlet orifice 68 are thereby fluidly coupled with a portion of the flowpath 40 extending within the exhaust duct 38. Here, the nozzle passage 100 forms an aft, downstream portion of the flowpath 40 through the exhaust nozzle 39 (e.g., along the nozzle sidewalls 104) to the outlet orifice 68. The exhaust nozzle 39 is thereby operable to exhaust the combustion products out of the aircraft powerplant 24 along a trajectory 108. The trajectory 108 may be parallel with the reference axis 86. Alternatively, the trajectory 108 may be slightly angularly offset from the reference axis 86, for example, by no more than plus/minus five degrees (5°) or ten degrees (10°). Thus, when the exhaust nozzle 39 is in its open position of FIG. 5A, the exhaust nozzle 39 may exhaust the combustion products out of the aircraft powerplant 24 substantially or completely horizontally. The exhaust combustion products may thereby provide/add to the forward aircraft thrust generated by the propulsor rotors 26 of FIG. 1. However, it is contemplated the trajectory 108 may alternatively be angularly offset from the reference axis 86 by an included angle (e.g., in a downward direction) to facilitate provision of vertical thrust. This included angle may be an acute angle (e.g., thirty degrees, forty-five degrees, sixty degrees) or a right angle.

When the exhaust nozzle 39 and its nozzle body 98 are in the closed position of FIG. 5B, the nozzle sidewalls 104 may be angularly offset from (e.g., perpendicular to) the flowpath 40. The top nozzle sidewall 104A may also extend across the flowpath 40. The top nozzle sidewall 104A of FIG. 5B may thereby (e.g., substantially or completely) block/cutoff flow of the combustion products further downstream through the flowpath 40. The top nozzle sidewall 104A, for example, may close off an aft, downstream end of the exhaust duct 38. The nozzle passage 100 and the outlet orifice 68 are thereby fluidly decoupled from the portion of the flowpath 40 extending within the exhaust duct 38. Little or none of the combustion products therefore are exhausted out of the exhaust nozzle 39, nor in a horizontal direction. Between the open position of FIG. 5A and the closed position of FIG. 5B, a centerline of the exhaust nozzle 39 and its nozzle body 98 may pivot at least ten degrees (10°), thirty degrees (30°) or sixty degrees (60°), up to ninety degrees (90°) for example.

To prevent a buildup of backpressure within the flowpath 40 while the exhaust nozzle 39 is in the closed position of FIG. 5B, the aircraft powerplant 24 may include a flowpath vent 110. The vent 110 of FIG. 5B includes one or more movable vent doors 112A-C (generally referred to as "112"); e.g., pivotable louvers. These doors 112 are distributed (e.g., side-by-side) longitudinally along the exhaust duct 38 and the flowpath 40 upstream of the exhaust nozzle 39. Each of the doors 112 is configured to open a respective opening 114A-C (generally referred to as "114") (e.g., port or other aperture) in a top sidewall 116 of the exhaust duct 38 when the exhaust nozzle 39 is in (and/or transitioning to) the closed position of FIG. 5B. The open doors 112 of FIG. 5B may thereby facilitate venting of the combustion products out of the flowpath 40 when the exhaust nozzle 39 closes the downstream portion of the flowpath 40. Furthermore, by positioning the openings 114 in the top sidewall 116, the vented combustion products may be vented (e.g., exhausted) a general upward direction away from the ground. The open vent 110 may thereby direct the relatively hot combustion products away from ground personnel who may be near the aircraft while the aircraft is, for example, on the ground with its gas turbine engine 36 running. Furthermore, the openings 114 may be sized to increase an exhaust area for the flowpath 40 when the combustion products are being vectored vertically upward. By contrast, when the exhaust nozzle 39 and its nozzle body 98 are in the open position of FIG. 5A, one or more or all of the doors 112 may be pivoted to their closed positions to close off (e.g., extend across, block, cover, etc.) the openings 114 in the top sidewall 116. Thus, the combustion products may be exhausted (e.g., only) out of the aircraft propulsion system 20 through the open exhaust nozzle 39.

In some embodiments, the doors 112 may be actuated (e.g., pivoted) by a common actuator/actuation system 117. In other embodiments, some or each of the doors 112 may be discretely actuated by its own dedicated actuator/actuation system. With such an arrangement, the doors 112 may be independently moved or may be moved synchronously together. Each actuator/actuator system may be configured as or otherwise include a hydraulic cylinder, a pneumatic motor or an electric motor. With such an arrangement, movement of the door(s) 112 is actively controlled. However, movement of the door(s) 112 may also or alternatively be passively controlled using, for example, a spring element; e.g., a torsion spring, a coil spring, etc. The spring element, for example, may bias the door(s) 112 closed. However, when the bias force of the spring element is overcome by, for example, backpressure within the flowpath 40, the door(s) 112 may open.

While the vent 110 is shown with the exhaust nozzle 39 of FIGS. 5A and 5B, the vent 110 may be configured with other exhaust nozzle arrangements. The vent 110, for example, may also be configured with the exhaust duct 38 of FIGS. 2A-2C upstream of the exhaust nozzle 39 in other embodiments. With any of these arrangements, it is contemplated the vent 110 may be open where the exhaust nozzle 39 is open and/or closed. In some embodiments, however, the vent 100 may only open when certain parameters are met; e.g., the aircraft is on ground, propulsion system power is below a threshold, etc.

Figure 6A:
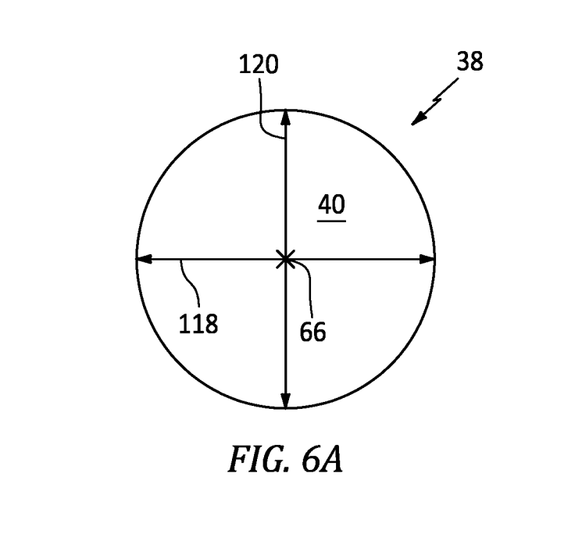
FIGS. 6A and 6B are cross-sectional illustrations of a flowpath taken respectively along section lines 6A-6A and 6B-6B in FIG. 1.
Figure 6B:
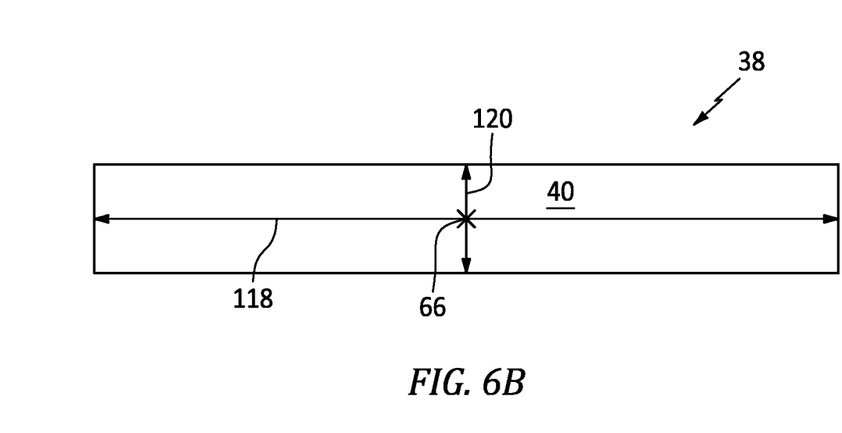
Figure 7A:
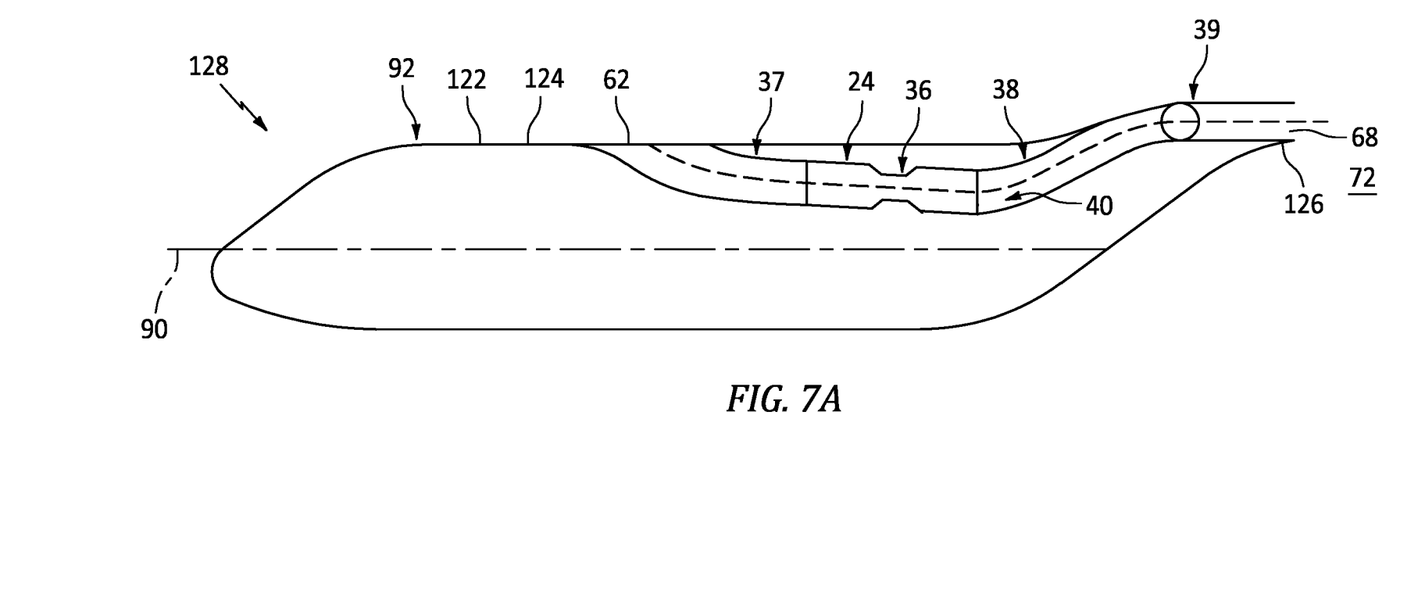
FIG. 7A is a schematic illustration of an aircraft powerplant arranged within an airframe of an aircraft.
Figure 7B:
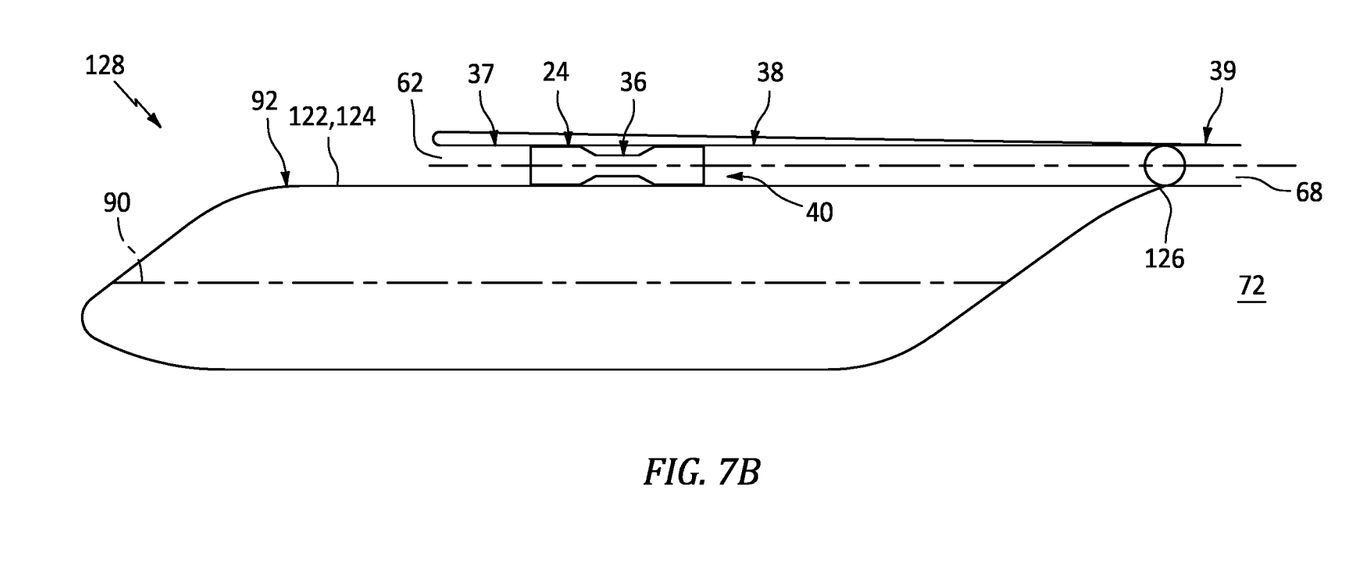
FIG. 7B is a schematic illustration of an aircraft powerplant mounted to an airframe of an aircraft.
Figure 8A:
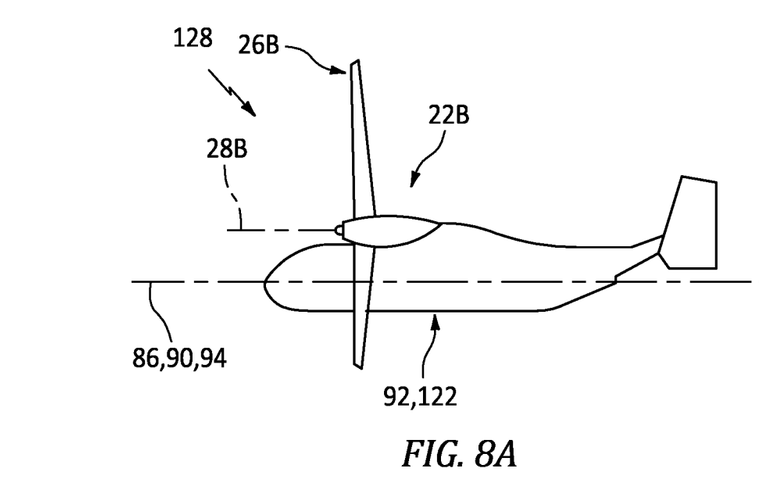
FIGS. 8A and 8B are side view illustrations of an aircraft with its aircraft propulsors in various arrangements.
Figure 8B:
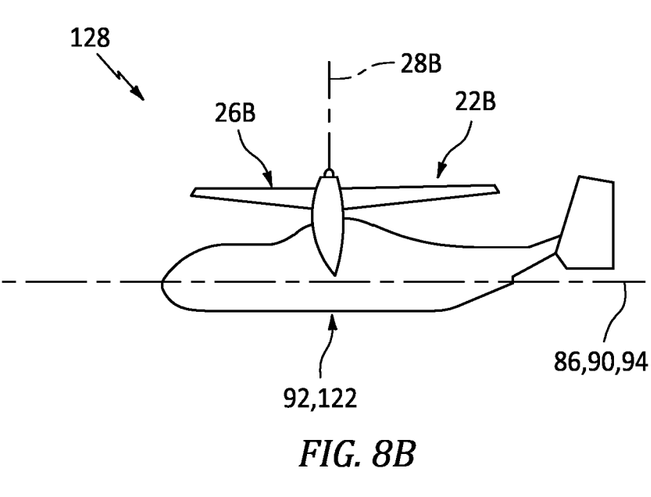

Referring to FIGS. 1, 6A and 6B, the flowpath 40 may have a cross-sectional geometry that changes (e.g., varies) as the flowpath 40 extends longitudinally along the centerline 66 from the gas turbine engine 36 (see FIG. 5A) to the exhaust nozzle 39 (see FIG. 6B), which cross-sectional geometry may be viewed in a reference plane perpendicular to the centerline 66 (or the horizontal axis 90; see FIGS. 7A and 7B). The cross-sectional geometry at the outlet 64 from the gas turbine engine 36 (see FIG. 6A), for example, may have a first shape; e.g., a circular shape. The cross-sectional geometry at the exhaust nozzle 39 (see FIG. 6B), on the other hand, may have a second shape different than the first shape; e.g., a non-circular shape such as a laterally elongated shape (e.g., a rectangular shape). Furthermore, the flowpath 40 may be configured with a changing aspect ratio. A lateral width 118 of the flowpath 40 at the outlet 64 from the gas turbine engine 36 (see FIG. 6A), for example, may be less than the lateral width 118 of the flowpath 40 at the exhaust nozzle 39 (see FIG. 6B). A vertical height 120 of the flowpath 40 at the outlet from the gas turbine engine 36 (see FIG. 6A), on the other hand, may be greater than the vertical height 120 of the flowpath 40 at the exhaust nozzle 39 (see FIG. 6B). An aspect ratio between the lateral width 118 and the vertical height 120 at the exhaust nozzle 39 (see FIG. 6B) may be greater than an aspect ratio between the lateral width 118 and the vertical height 120 at the outlet 64 from the gas turbine engine 36 (see FIG. 6A).

Referring to FIG. 7A, the aircraft powerplant 24 may be mounted with the aircraft airframe 92. The aircraft powerplant 24 of FIG. 7A and any one or more of its components 36-39, for example, may be arranged with (e.g., within) a fuselage 122 of the aircraft airframe 92. The aircraft powerplant 24 of FIG. 7A and its gas turbine engine 36, in particular, are disposed at (e.g., on, adjacent or proximate) a top side 124 of the fuselage 122. The exhaust nozzle 39 of FIG. 7A is disposed at the top side 124 and an aft end 126 of the aircraft fuselage 122. The present disclosure, however, is not limited to such an exemplary aircraft powerplant arrangement. The aircraft powerplant 24 and any one or more of its components 36-39, for example, may alternatively be arranged with and mounted to an aircraft wing, an exterior of the aircraft airframe 92, or otherwise. The aircraft powerplant 24 and its components 36-39 of FIG. 7B, for example, are mounted to a top of the aircraft airframe 92.

Figure 9A:
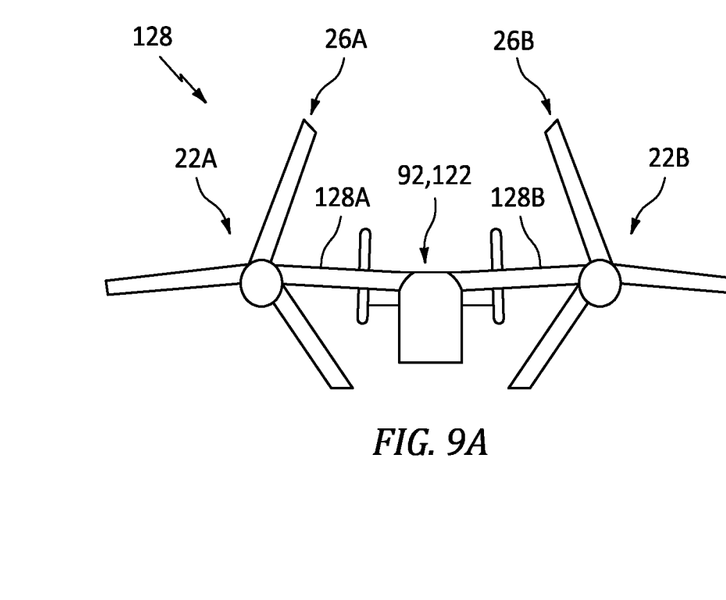
FIGS. 9A and 9B are front view illustrations of the aircraft of FIGS. 8A and 8B with its aircraft propulsors in various arrangements, where the arrangement of FIG. 9A corresponds to the arrangement of FIG. 8A, and where the arrangement of FIG. 9B corresponds to the arrangement of FIG. 8B.
Figure 9B:
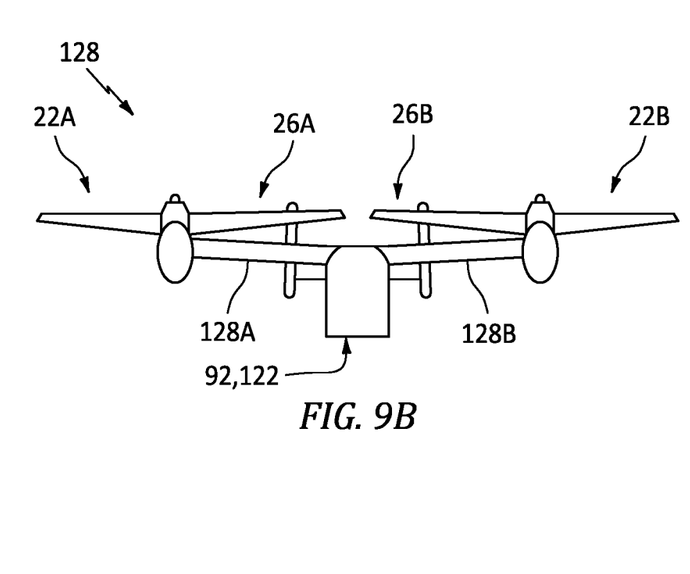

Referring to FIGS. 8A-9B, the aircraft 128 may be configured as a tiltrotor aircraft. The aircraft propulsors 22A and 22B of FIGS. 8A-9B, for example, are disposed on opposing sides of the aircraft airframe 92. More particular, each of the aircraft propulsor 22A, 22B of FIGS. 9A and 9B is mounted with a respective aircraft wing 128A, 128B connected to and projecting out from the aircraft fuselage 122. Each of these aircraft propulsors 22 is configured to move (e.g., pivot) between a horizontal thrust position (see FIGS. 8A and 9A) and a vertical thrust position (see FIGS. 8B and 9B). More particularly, each of the aircraft propulsors 22 may be configured as part of a tiltrotor module movable (e.g., pivotable) between the horizontal thrust position (see FIGS. 8A and 9A) and a vertical thrust position (see FIGS. 8B and 9B). When the aircraft propulsors 22 are in the horizontal thrust position of FIG. 8A, the rotational axes 28 may be parallel with or slightly angularly offset from the gravitational horizon line 94. When the aircraft propulsors 22 are in the vertical thrust position of FIG. 8B, the rotational axes 28 may be angularly offset from the gravitational horizon line 94 by a relatively large acute angle or a right angle. Notably, the exhaust nozzle 39 (see FIGS. 1, 2A-C, 5A and 5B) described above may be operated independent of (or in conjunction with) movement of the aircraft propulsors 22 between the horizontal thrust positions (see FIGS. 8A and 9A) and the vertical thrust positions (see FIGS. 8B and 9B).

While the aircraft 128 is described above as a tiltrotor aircraft, the aircraft 128 may alternatively be configured as a tiltwing aircraft. The aircraft propulsors 22, for example, may be fixedly mounted to the aircraft wings 128, and a portion or an entirety of each aircraft wing 128 may be moved (e.g., pivoted) between the horizontal thrust position and the vertical thrust position. The present disclosure, however, is not limited to such exemplary tiltrotor or tiltwing aircrafts.

While the aircraft powerplant 24 and its exhaust nozzle 39 are described above with respect to certain aircraft embodiments, the present disclosure is not limited thereto. The aircraft powerplant 24 and its exhaust nozzle 39, for example, may be configured with any aircraft which would benefit from a vectoring exhaust/an open-closeable exhaust. The aircraft, for example, may alternatively be configured as a fixed rotor airplane, a helicopter, a drone (e.g., an unmanned aerial vehicle (UAV)) or any other manned or unmanned aerial vehicle.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
a powerplant including a gas turbine engine, an exhaust nozzle and a flowpath extending from the gas turbine engine to the exhaust nozzle;
the exhaust nozzle movable between a first position and a second position;
the exhaust nozzle configured to exhaust combustion products received from the flowpath when the exhaust nozzle is in the first position;
the exhaust nozzle configured to block flow of the combustion products through the exhaust nozzle when the exhaust nozzle is in the second position; and
a passage extending through the exhaust nozzle along a nozzle centerline, wherein the nozzle centerline of the exhaust nozzle in the first position is angularly offset from the nozzle centerline of the exhaust nozzle in the second position by an included angle.

2. The assembly of claim 1, wherein the exhaust nozzle is configured to rotate between the first position and the second position.

3. The assembly of claim 1, wherein
the exhaust nozzle includes an outlet orifice, and the passage extends through the exhaust nozzle to the outlet orifice;
the passage is fluidly coupled with the flowpath when the exhaust nozzle is in the first position; and
the passage is fluidly decoupled from the flowpath when the exhaust nozzle is in the second position.

4. The assembly of claim 1, wherein
the powerplant further includes an exhaust duct between the gas turbine engine and the exhaust nozzle;
the exhaust nozzle is configured to open a downstream end of the exhaust duct when the exhaust nozzle is in the first position; and
the exhaust nozzle is configured to close the downstream end of the exhaust duct when the exhaust nozzle is in the second position.

5. The assembly of claim 1, wherein
the exhaust nozzle includes a nozzle sidewall;
the nozzle sidewall extends along the flowpath when the exhaust nozzle is in the first position; and
the nozzle sidewall extends across the flowpath when the exhaust nozzle is in the second position.

6. The assembly of claim 1, wherein
the exhaust nozzle includes an outlet orifice, and the passage extends through the exhaust nozzle to the outlet orifice; and
the exhaust nozzle converges as the passage extends to the outlet orifice.

7. The assembly of claim 1, wherein
a first cross-sectional geometry of the flowpath at the gas turbine engine is circular; and
a second cross-sectional geometry of the flowpath at the exhaust nozzle is non-circular.

8. The assembly of claim 1, wherein
the flowpath has a lateral width and a vertical height;
the flowpath has a first aspect ratio between the lateral width and the vertical height at the gas turbine engine; and
the flowpath has a second aspect ratio between the lateral width and the vertical height at the exhaust nozzle that is greater than the first aspect ratio.

9. The assembly of claim 1, wherein
the powerplant further includes an exhaust duct and a door;
the exhaust duct forms a portion of the flowpath between the gas turbine engine and the exhaust nozzle; and
the door is configured to close an opening in a sidewall of the exhaust duct when the exhaust nozzle is in the first position, and the door is configured to open the opening in the sidewall of the exhaust duct when the exhaust nozzle is in the second position.

10. The assembly of claim 9, wherein the door is configured to pivot between a closed position and an open position.

11. The assembly of claim 9, wherein
the powerplant further includes a second door upstream of the door along the flowpath; and
the second door is configured to close a second opening in the sidewall of the exhaust duct when the exhaust nozzle is in the first position, and the second door is configured to open the second opening in the sidewall of the exhaust duct when the exhaust nozzle is in the second position.

12. The assembly of claim 1, wherein
the exhaust nozzle is configured to exhaust the combustion products in a first direction when the exhaust nozzle is in the first position; and
the powerplant further includes a vent between the gas turbine engine and the exhaust nozzle along the flowpath, and the vent is configured to open and vent the combustion products in a second direction when the exhaust nozzle is in the second position.

13. The assembly of claim 1, further comprising:
an airframe;
the gas turbine engine arranged within the airframe.

14. The assembly of claim 1, further comprising:
a propulsor rotor;
the gas turbine engine configured to power rotation of the propulsor rotor.

15. The assembly of claim 14, further comprising:
a second propulsor rotor;
the gas turbine engine configured to power rotation of the second propulsor rotor; and
the gas turbine engine positioned laterally between the propulsor rotor and the second propulsor rotor.

16. The assembly of claim 14, further comprising a tiltrotor module configured to adjust an orientation of a rotational axis of the propulsor rotor.

17. An assembly for an aircraft, comprising:
a powerplant including a gas turbine engine, an exhaust duct, an exhaust nozzle, a vent and a flowpath extending from the gas turbine engine, through the exhaust duct, to the exhaust nozzle;
the exhaust nozzle rotatable between a first position and a second position;
the vent comprising a vent door, the vent configured to close an opening in a sidewall of the exhaust duct using the vent door when the exhaust nozzle is in the first position, and the vent configured to open the opening in the sidewall of the exhaust duct when the exhaust nozzle is in the second position;
the exhaust nozzle is configured to exhaust combustion products received through the exhaust duct from the gas turbine engine when the exhaust nozzle is in the first position; and
the exhaust nozzle configured to block flow of the combustion products through an end of the exhaust duct when the exhaust nozzle is in the second position.

* * * * *